United States Patent [19]

Briese

[11] Patent Number: 4,706,410
[45] Date of Patent: Nov. 17, 1987

[54] INSECT TRAP

[76] Inventor: Michael W. Briese, 10308 Cherry Tree La., Silver Spring, Md. 20901

[21] Appl. No.: 937,458

[22] Filed: Dec. 2, 1986

Related U.S. Application Data

[63] Continuation of Ser. No. 876,434, Jun. 20, 1986, abandoned.

[51] Int. Cl.[4] .............................................. A01M 1/10
[52] U.S. Cl. ........................................ 43/107; 43/122
[58] Field of Search .......................... 43/107, 122, 118

[56] References Cited

U.S. PATENT DOCUMENTS

| | | | |
|---|---|---|---|
| 1,783,631 | 12/1930 | Sladky | 43/107 |
| 1,787,421 | 12/1930 | Ruddell | 43/107 |
| 1,968,953 | 8/1934 | Metzger | 43/107 |
| 2,162,502 | 6/1939 | Goulard | 43/107 |
| 2,715,295 | 8/1955 | Brown | 43/107 |
| 2,809,465 | 10/1957 | Guinotte | 43/122 |

Primary Examiner—Gene P. Crosby
Attorney, Agent, or Firm—Quaintance, Murphy & Presta

[57] ABSTRACT

The insect trap of the present invention comprises a conical shell having a downwardly and inwardly tapered sidewall and an upstanding annular rim provided at the top of the sidewall. Baffles are positioned within the conical shell and extend upwardly therefrom. An insect receptacle is provided into which the bottom of the conical shell opens. The baffles of the insect trap preferably comprises four fins, each fin having a slot and an aperture formed therein. Flat insect lures which extend through the slots in the fins are provided in the baffles and a plug-like insect lure is positioned in the aperture in one of the fins of the baffles. The two types of insect lures effectively attract insects into the insect trap such that insects like the baffles, fall downwardly through the conical shell and are captured in the insect receptacle.

8 Claims, 4 Drawing Figures

U.S. Patent  Nov. 17, 1987  4,706,410
FIG.1
FIG.2
FIG.3
FIG.4
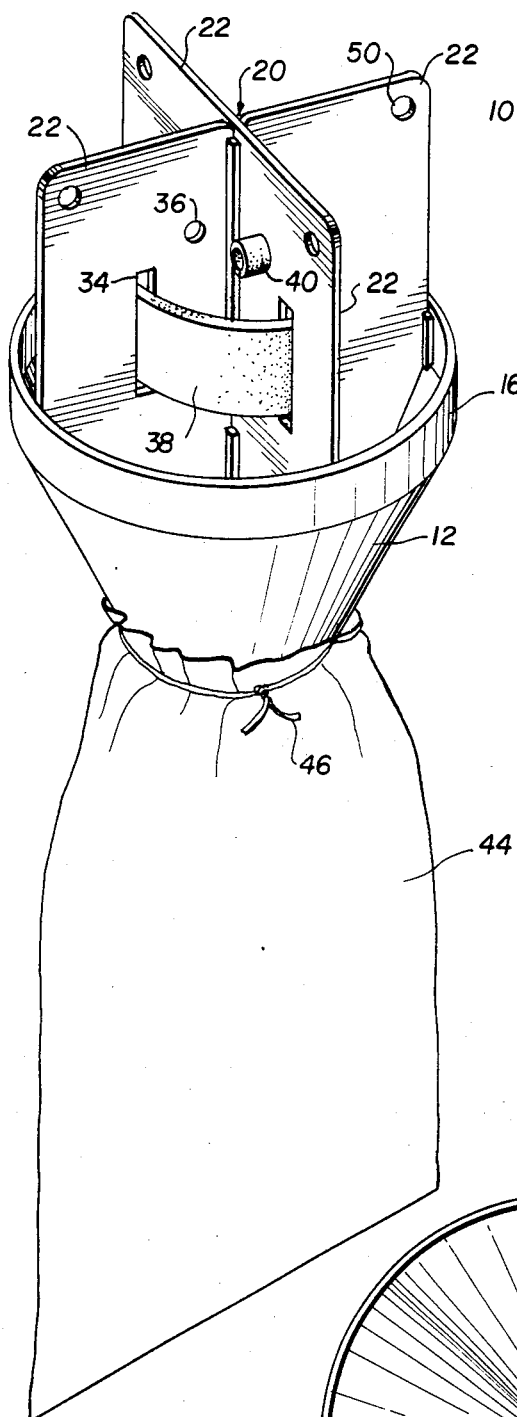
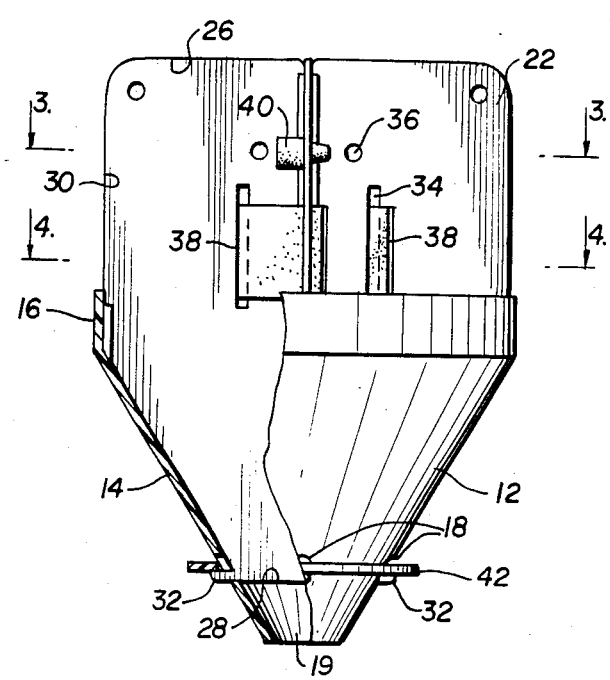
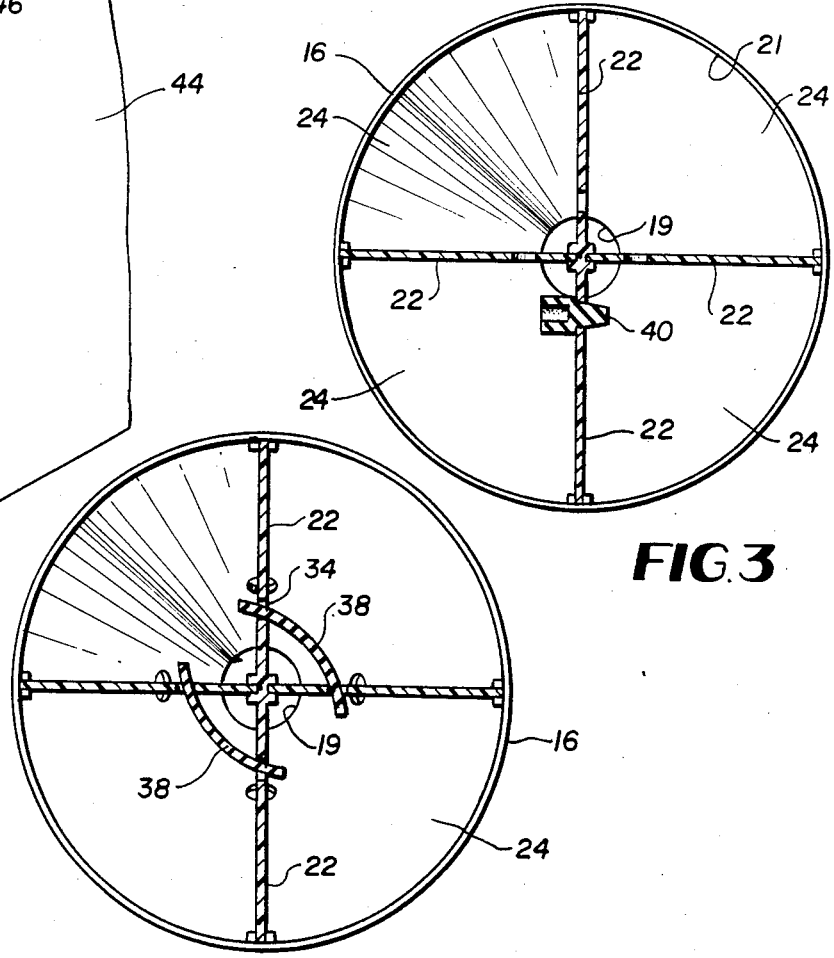

4,706,410

INSECT TRAP

This is a continuation of application Ser. No. 876,434 filed June 20, 1986, now abandoned.

BACKGROUND OF THE INVENTION

Insect traps particularly suited for capturing Japanese beetles are known. Known Japanese beetle traps typically comprise a funnel-like conduit having baffle means positioned therein and have an insect receptacle provided at the bottom of the funnel-like conduit. Generally, insect bait in the form of a sex lure or a floral lure is provided on or within the baffle means to attract the insects to the insect trap.

Known insect traps suffer from a number of disadvantages. The positioning of the bait in known insect traps, for example, tends to attract insects to only one side or less than all sides of the trap. Thus, many insects in the vicinity of the trap are not attracted to the trap and are not captured. In addition, the construction of the funnel-like conduit of many known traps permits many insects attracted to the trap by the bait to escape without being captured.

It is, therefore, an object of the present invention to provide an improved insect trap which does not suffer from the disadvantages of known insect traps.

It is a further object of the present invention to provide an insect trap which contains both a sex lure and a floral lure.

Another object of the present invention is to provide an insect trap which does not permit insects attracted to the trap to escape therefrom.

Yet another object of the present invention is to provide an improved insect trap wherein at least a portion of a floral lure extends into each section formed by the baffle means.

Yet a further object of the present invention is to provide an improved insect trap wherein the scent emitted by the sex lure extends into all sections formed by the baffle means.

Still another object of the present invention is to provide an insect trap having improved means for retaining the insect receptacle in order to ensure that all insects entering the trap are captured.

Additional objects and advantages of the present invention will be understood by reference to the following description and drawings wherein:

FIG. 1 is a perspective view of an insect trap of the present invention;

FIG. 2 is a partially cut away, side elevational view of the insect trap of FIG. 1, without the insect receptacle;

FIG. 3 is a cross sectional view taken along line 3—3 of FIG. 2; and

FIG. 4 is a cross sectional view taken along line 4—4 of FIG. 2.

SUMMARY OF THE INVENTION

According to the present invention there is provided an improved insect trap of the type generally used to capture Japanese beetles. The insect trap of the present invention comprises a conical shell having a downwardly, inwardly tapered sidewall with a top and a bottom and a generally, vertically upstanding annular rim provided at the top of the sidewall. The conical shell has an upper opening formed by the annular rim and a lower opening formed by the bottom of the sidewall.

Baffle means are positioned within the conical shell and extend generally vertically, upwardly therefrom. The baffle means preferably comprises four fins and four quadrants, each of the quadrants being formed by an adjacent pair of fins. Each of the fins has a generally vertical slot and an aperture provided therein. Flat insect lures extend through the vertical slots in the fins such that at least a portion of one of the flat insect lures is provided within each quadrant of the baffle means. An additional insect lure, in the form of a resilient plug, is removably positioned within the aperture of one of the fins. An insect receptacle is provided below the conical shell such that the lower opening of the conical shell is located within the insect receptacle.

In use, insects are attracted to the insect trap of the present invention by the insect lures. The insects fly into the insect trap, striking one of the fins of the baffle means, and then fall downwardly through the conical shell and into the insect receptacle and are thereby captured.

DETAILED DESCRIPTION OF THE INVENTION

Referring now to the drawings, and in particular to FIGS. 1 and 2, there is shown an insect trap 10 of the present invention. The insect trap 10 comprises a conical shell 12 having a downwardly, inwardly tapered sidewall 14 with a top and a bottom. A generally vertically upstanding annular rim 16 is provided at the top of the sidewall 14. Preferably, the sidewall 14 has a plurality of tab-receiving passages 18 provided near the bottom thereof. The conical shell 12 is generally symmetrical about a vertical central axis of rotation and has a lower opening 19 formed by the bottom of the sidewall 14 and an upper opening 21 formed by the annular rim 16.

Baffle means 20 in the form of a plurality of fins 22 are positioned within the conical shell 12 and extend vertically upwardly therefrom. Baffle means 20 preferably comprises four substantially identical fins 22 which extend radially outwardly from the central axis of rotation of the conical shell 12. Baffle means 20 further comprises four insect-receiving quadrants 24, each of which is defined by an adjacent pair of fins 22. Each fin 22 has an upper edge 26 located above the annular rim 16 and a lower edge 28 located below the annular rim 16. Each fin 22 also has an outer edge 30 which extends from the upper edge 26 to the lower edge 28. Outer edge 30 has a substantially vertical upper portion which contacts the inner surface of the annular rim 16 and extends upwardly above the annular rim 16, and has an inclined lower portion which contacts the inner surface of the sidewall 14 of the conical shell 12. The lower portion of the outer edge 30 has a tab 32 protruding therefrom, which tab is received in one of the tab-receiving passages 18 in the sidewall 14, as shown in FIG. 2.

Each fin 22 has a substantially vertical slot 34 provided therein. The slot 34 is located below the upper edge 26 of the fin 22 and extends above the annular rim 16 of the conical shell 12. Each fin 22 also has an aperture 36 extending therethrough. The aperture 36 is preferably located above the slot 34 in the fin 22. The slots 34 in the fins 22 preferably are substantially radially aligned within the baffle means 20. The apertures 36 in the fins 22 are similarly substantially radially aligned within the baffle means 20.

As can best be seen in FIGS. 2 and 4, insect trap 10 further comprises two substantially flat, flexible insect lures 38, which are preferably floral lures. The flat lures 38 are positioned within the baffle means 20 through the slots 34 in the fins 22. One of the flat lures 38 extends through the slots 34 in a first pair of adjacent fins 22 such that the ends of this flat lure are located in opposed quadrants 24 of the baffle means 20. The other flat lure 38 extends through the slots 34 in a second pair of adjacent fins 22 such that the ends of this other flat lure 38 are located in the same opposed quadrants 24 as the ends of the one flat lure 38. Thus, each quadrant 24 of the baffle means 20 has a portion of at least one of the flat lures 38 provided therein.

As can best be seen in FIGS. 2 and 3, a plug-like lure 40, which is preferably a sex lure, is also positioned within the baffle means 20. This plug-like lure 40 is removably positioned within one of the apertures 36 in the fins 22. This plug-like lure 40 is preferably made of a flexible and resilient material which thus permits the pluglike lure 40 to be readily removed or replaced. The radial alignment of the apertures 36 in the fins 22 insures that the scent emitted by the plug-like lure 40 carries into all of the quadrants 24 of the baffle means 20.

Referring again to FIG. 2, it can be seen that the insect trap 10 further comprises an annular ring 42 which extends around the outer surface of the conical shell 12 near the bottom thereof. Annular ring 42 serves a dual purpose in the insect trap 10. Annular ring 42 is positioned just above the tab-receiving passages 18 in the sidewall 14 of the conical shell, thereby retaining the tabs 32 on the outer edge 30 of the fins 22 in position the passages 18. Thus, annular ring 42 constitutes means for removably retaining baffle means 20 in position in the conical shell 12. Annular ring 42 further serves the purpose of providing means for attaching insect receptacle 44 to the conical shell 12. Insect receptacle 44, which is shown in FIG. 1, preferably is a flexible bag of the type typically used in insect traps. Insect receptacle 44 has an open mouth through which the bottom of the conical shell 12 is inserted. Insect receptacle 44 is secured to the conical shell 12 by any suitable fastening means 46 which is securely tied or fastened just above the annular ring 42.

In use, insect trap 10 is mounted on any suitable support in an insect infested area. Means for suspending the insect trap 10 from the support can be attached to the holes 50 provided in the upper portions of the fins 22. Insects are attracted to the insect trap 10 by the lures 38, 40. The insects will then fly into one of the quadrants 24 of the baffle means 20 and strike one of the fins 22. After striking a fin 22, the stunned insect will fall through the lower opening of the conical shell 12 and into the insect receptacle 44. The lower opening of the conical shell 12 is of a size which is sufficient to permit the insect to pass downwardly therethrough, but is too small to permit the insect to pass upwardly therethrough when its wings are extended. Thus, insects are unable to fly out of the insect receptacle 44. The annular rim 16 of the conical shell 12 ensures that insects which strike the fins 22 are not deflected out of the insect trap 10. Thus, annular rim 16 ensures that insects flying into the fins 22 will drop into the conical shell 12 and then into the insect receptable 44.

Although the invention has been described in detail with reference to specific embodiments thereof, it will be understood that variations can be made without departing from the scope of the invention as described above and as claimed below.

What is claimed is:

1. An insect trap comprising:
   A. a substantially conical shell with a central axis, said shell having:
     a downwardly and inwardly tapered sidewall with a top and a bottom,
     an upstanding annular rim provided at the top of the sidewall,
     a lower opening defined by the bottom of the side wall, and
     an upper portion defined by the annular rim;
   B. baffle means positioned within the conical shell and extending generally vertically upwardly therefrom, said baffle means comprising a plurality of fins which extend generally radially outwardly from the central axis of the shell and a plurality of baffle spaces being defined by and between adajacent fins, each of said fins having:
     an upper edge located above the annular rim,
     a lower edge located within the conical shell below the annular rim,
     an outer edge having a substantially vertical upper portion in contact with an inner surface of the annular rim and extending upwardly above the annular rim, and an inclined lower portion in contact with the inner surface of the sidewall of the conical shell, and
     an upwardly extending slot formed therein below the upper edge of the fin and extending above the annular rim of the conical shell,
     wherein the slots in the fins are substantially horizontally aligned,
   C. substantially flat first insect lures extending through the slots in adjacent fins such that a portion of at least one of said flat insect lures is located in each of the baffle spaces of the baffle means;
   D. an insect receptacle having an open top in which the bottom of the conical shell is received such that the lower opening of the conical shell is located below the open top of the insect receptacle; and
   E. means for removably securing the insect receptacle to the conical shell.

2. The insect trap of claim 1 wherein each of said fins has an aperture formed therein below the upper edge thereof, said apertures in said fins being substantially horizontally aligned, and a second insect lure is removably positioned within the aperture of one of said fins.

3. The insect trap of claim 1 wherein the first insect lures are floral lures.

4. The insect trap of claim 2 wherein the second lure is a sex lure.

5. The insect trap of claim 1 wherein the sidewall of the conical shell has a plurality of tab-receiving passages formed therethrough near the bottom of the sidewall, and
   wherein the fins have outwardly extending tabs on the lower portion thereof, said tabs extending through the tab-receiving passages in the sidewall to retain the fins in the conical shell.

6. The insect trap of claim 5 further comprising an annular member, said annular member being positioned around an outer surface of the sidewall of the conical shell directly above and in contact with the tabs which extend through the tab-receiving passages in the sidewall of the conical shell.

7. The insect trap of claim 1 wherein said baffle means comprises four fins which define said baffle spaces in the form of quadrants therebetween, and a pair of first insect lures are mounted in the slots of said fins, each first insect lure being disposed in a quadrant and extending through the slots of two adjacent fins into the adjacent quadrants on both sides thereof.

8. An insect trap comprising:
A. a conical shell having a downwardly and inwardly tapered sidewall with a top and a bottom and a generally vertically upstanding annular rim provided at the top of the sidewall, said sidewall having a plurality of tab-receiving passages near the bottom thereof, said conical shell having a generally vertical central axis and having a lower opening formed by the bottom of the sidewall and an upper opening formed by the annular rim;
B. baffle means received within the conical shell and extending generally vertically upwardly therefrom, said baffle means comprising four fins which extend radially outwardly from the central axis of the conical shell and four insect-receiving quadrants, each insect receiving quadrant being defined by an adjacent pair of fins, each of said fins having an upper edge located above the annular rim, a lower edge located below the annular rim and an outer edge with a substantially vertical upper portion in contact with an inner surface of the annular rim and extending upwardly above the annular rim and an inclined lower portion in contact with an inner surface of the sidewall of the conical body, the lower portion of the outer edge being provided with a tab which extends through one of the tab-receiving passages in the side wall;
  wherein each fin has a generally vertical slot provided therein, said slot being located below the upper edge of the fin and extending above the annular rim of the conical shell; and
  wherein each fin has an aperture formed therein, said aperture being located above the vertical slot in the fin; and
  wherein the vertical slots in the fins are substantially horizontally aligned within the baffle means; and
  wherein the apertures in the fins are substantially horizontally aligned within the baffle means;
C. two flat floral lures positioned within the baffle means, a first flat floral lure extending through the slots in a first pair of adjacent fins such that the ends of the first flat floral lure are located in opposed quadrants of the baffle means, and a second flat floral lure extending through the slots in a second pair of adjacent fins such that the ends of the second flat floral lure are located in the same opposed quadrants as the ends of the first flat floral lure, whereby each quadrant of the baffle means has a portion of at least one of the flat floral lures provided therein;
D. a sex lure positioned within the baffle means, said sex lure being a plug which is removably received within one of the apertures in the fins; and
E. an annular member positioned around the outer surface of the sidewall of the conical shell, said annular member being positioned directly above and in contact with the tabs on the outer edge of each fin, which tabs extend through the tab-receiving passages in the side wall of the conical shell;
F. a flexible insect receptacle comprising a bag having an open top, said insect receptacle being positioned below the conical shell such that the bottom of the sidewall of the conical shell is located within the bag and the open top of the bag is located above the annular member on the outer surface of the side wall; and
G. means for fastening the insect receptacle to the conical shell, said means being positioned around the insect receptacle, above the annular member;
whereby, the floral lures and the sex lure attract insects to the insect trap so that insects fly into the baffle means, strike one of the fins, and fall downwardly through the conical shell into the insect receptacle and are retained within the insect receptacle.

* * * * *